(12) United States Patent
Brewer et al.

(10) Patent No.: US 8,985,877 B1
(45) Date of Patent: Mar. 24, 2015

(54) QUICK ATTACHMENT AND RELEASE ACCESSORY HARNESS

(71) Applicants: Everett Brewer, Taylor, AZ (US);
Roger Cameron Love, Show Low, AZ (US)

(72) Inventors: Everett Brewer, Taylor, AZ (US);
Roger Cameron Love, Show Low, AZ (US)

( * ) Notice: Subject to any disclaimer, the term of this patent is extended or adjusted under 35 U.S.C. 154(b) by 0 days.

(21) Appl. No.: 14/325,641

(22) Filed: Jul. 8, 2014

Related U.S. Application Data

(60) Provisional application No. 61/844,164, filed on Jul. 9, 2013.

(51) Int. Cl.
*G03B 17/00* (2006.01)
*F16B 2/06* (2006.01)

(52) U.S. Cl.
CPC ........................................ *F16B 2/06* (2013.01)
USPC ........................................................ 396/419

(58) Field of Classification Search
CPC ........................................................ F16B 2/06
USPC ........................................................ 396/419
See application file for complete search history.

(56) References Cited

U.S. PATENT DOCUMENTS

| | | | | |
|---|---|---|---|---|
| 2,733,629 A * | 2/1956 | Vogt | ............................. | 411/342 |
| 2,908,196 A * | 10/1959 | Apfelzweig | .................. | 411/344 |
| 2,940,708 A * | 6/1960 | Adolf | ............................. | 248/168 |
| 5,898,987 A * | 5/1999 | Onofrio | .......................... | 29/446 |
| 8,418,900 B1 * | 4/2013 | Baker | ............................ | 224/262 |
| 8,573,865 B2 * | 11/2013 | Chamberlayne | .............. | 396/419 |
| 8,817,178 B2 * | 8/2014 | Baker | ............................ | 348/375 |
| 2008/0156948 A1 * | 7/2008 | Cameron et al. | ............. | 248/187.1 |
| 2011/0085873 A1 * | 4/2011 | Guthrie et al. | ................... | 411/55 |
| 2012/0328392 A1 * | 12/2012 | Difante | ......................... | 411/342 |
| 2013/0256475 A1 * | 10/2013 | Warner | ........................ | 248/176.1 |
| 2014/0017031 A1 * | 1/2014 | Prichard et al. | ................ | 411/204 |
| 2014/0190060 A1 * | 7/2014 | Sherman | ........................... | 42/94 |

* cited by examiner

*Primary Examiner* — Rodney Fuller
(74) *Attorney, Agent, or Firm* — Kenneth L. Green

(57) ABSTRACT

A quick attachment and release device and base may attach to a tri-pod or be carried on a harness worn by a user and includes a quick release allowing easy attachment of accessories. The device and base includes a shaft which enters a passage in the base and is retained by a toggle at a toggle end of the shaft. The toggle end of the shaft is passed through the passage and the toggle is rotated into a locked position preventing removal of the shaft. A spring on a spring end of the shaft, opposite to the toggle end, retains the toggle in the locked position. The quick release may be used to attach the accessories to the accessory harness which includes a connector supported by a bi-pod carried by suspender straps, and optionally a third leg. The same accessories may be attached to tri-pods using the shoe mount.

20 Claims, 7 Drawing Sheets

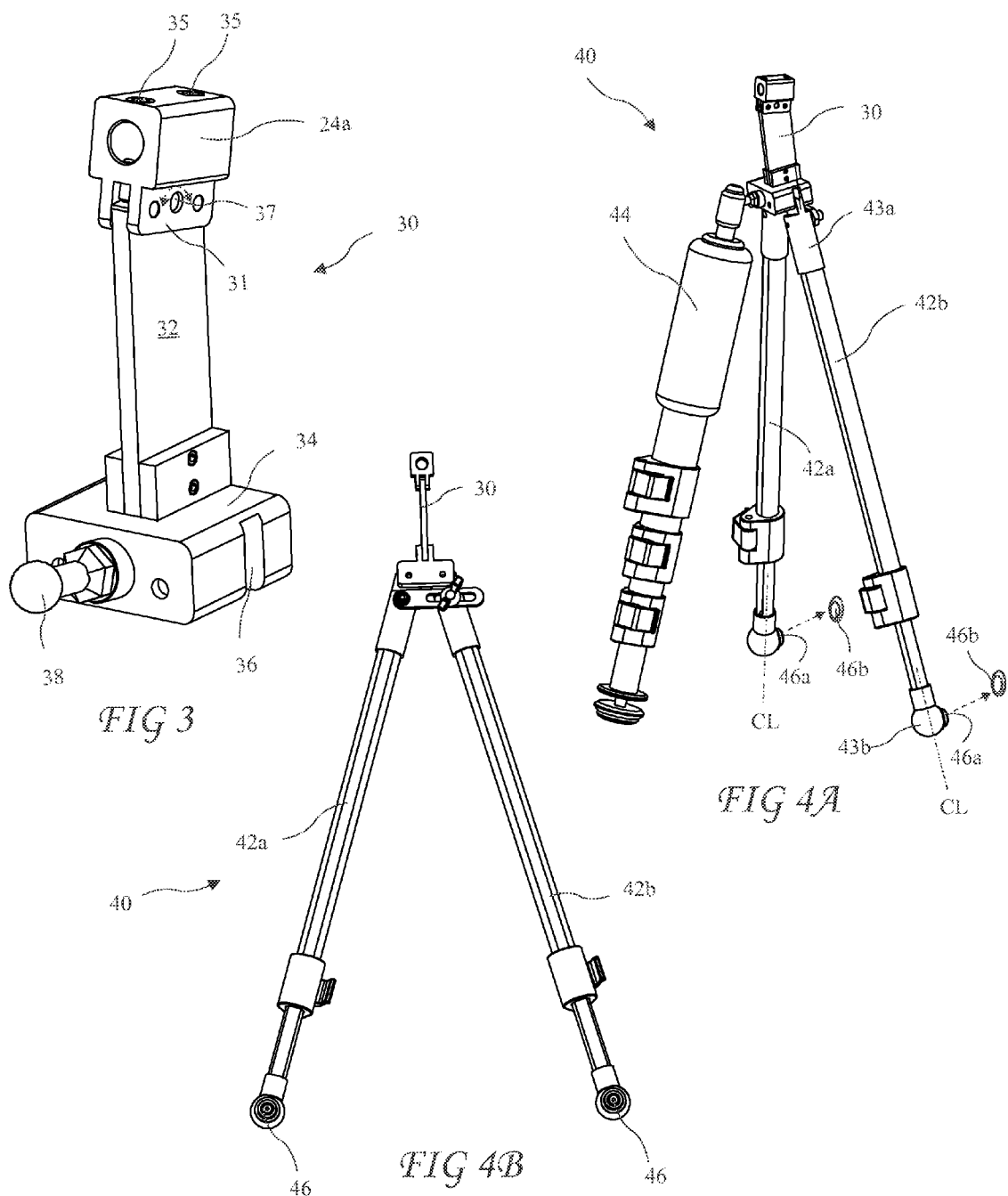

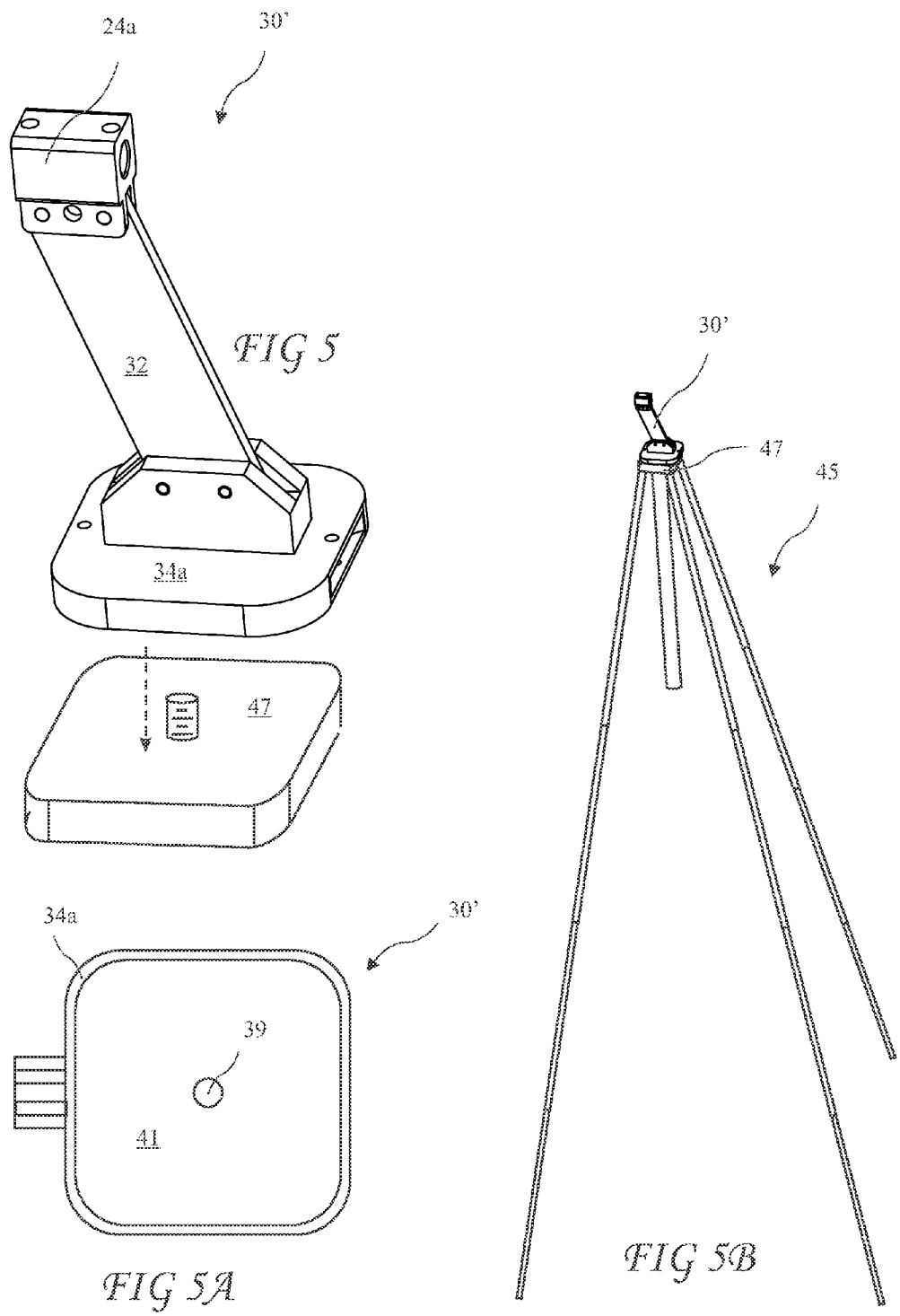

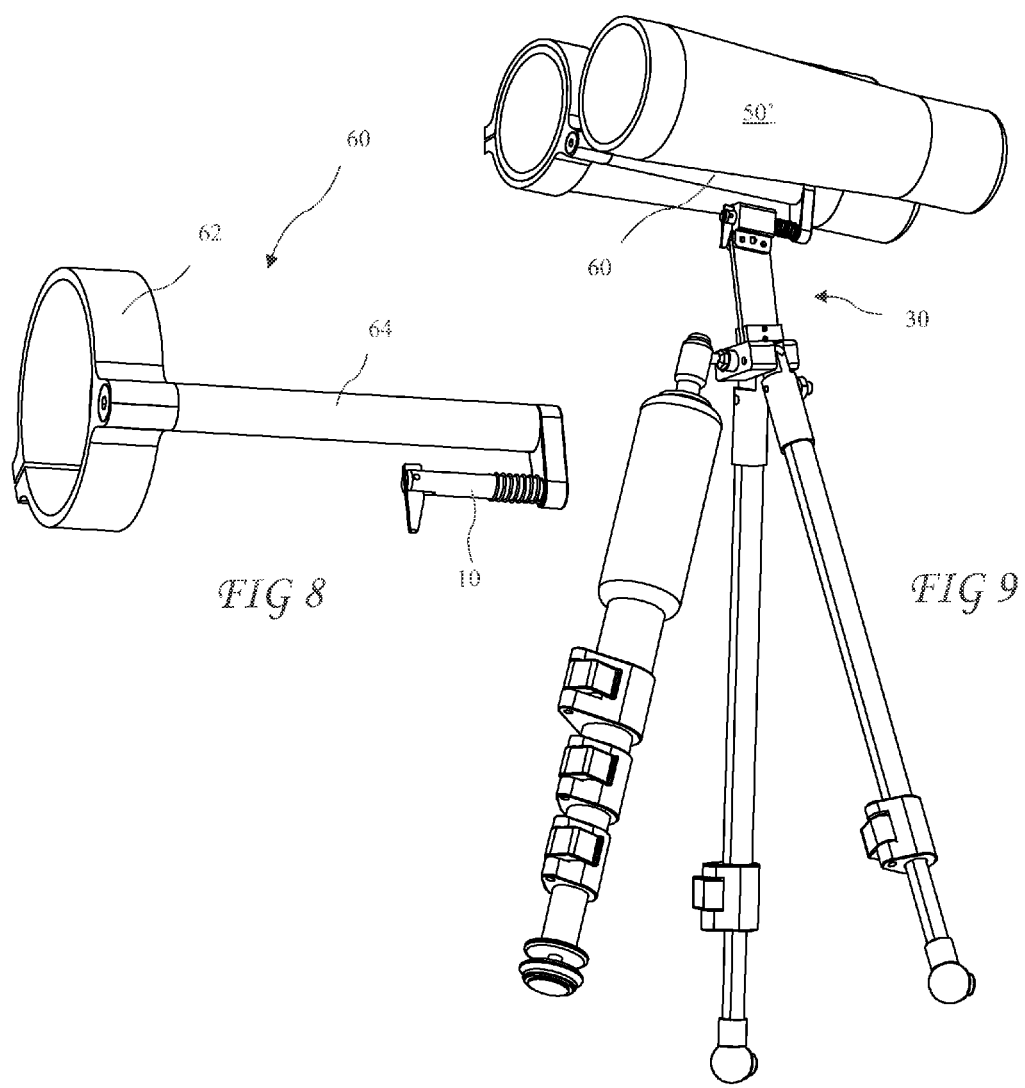

QUICK ATTACHMENT AND RELEASE ACCESSORY HARNESS

CROSS-REFERENCE TO RELATED APPLICATIONS

The present application claims the priority of U.S. Provisional Patent Application Ser. No. 61/844,164 filed Jul. 9, 2013, which application is incorporated in its entirety herein by reference.

BACKGROUND OF THE INVENTION

The present invention relates to accessory attachment and hands free carrying and in particular to a quick attachment and release accessory device and base allowing accessories to be easily attached to a tri-pod, or easily attached and carried by a harness.

There is a frequent need for a system allowing accessories to be easily attached and carried. In particular, impaired individuals have great difficulty in attaching and using accessories such as spotting scopes, binoculars, and cameras. Such items generally require one or even two free hands to attach, hold, and use.

BRIEF SUMMARY OF THE INVENTION

The present invention addresses the above and other needs by providing a quick attachment and release device and base which may attach to a tri-pod or be carried on a harness worn by a user and includes a quick release allowing easy attachment of accessories. The device and base includes a shaft which enters a passage in the base and is retained by a toggle at a toggle end of the shaft. The toggle end of the shaft is passed through the passage and the toggle is rotated into a locked position preventing removal of the shaft. A spring on a spring end of the shaft, opposite to the toggle end, retains the toggle in the locked position. The quick release may be used to attach the accessories to the accessory harness which includes a connector supported by a bi-pod carried by suspender straps, and optionally a third leg. The same accessories may be attached to tri-pods using the shoe mount.

In accordance with one aspect of the invention, there is provided a quick attachment and release device having a base easily attachable to accessories using a quick release system having a shaft, a spring, and a toggle. The toggle is passed through a passage and the toggle is rotated into a locked position preventing removal of the shaft from the passage. A spring on a spring end of the shaft opposite to the toggle end retains the toggle in the locked position.

In accordance with another aspect of the invention, there is provided a quick attachment and release device having a base connector mating to a tri-pod shoe. Once attached to the tri-pod, a variety of accessories are quickly and easily attachable to the tri-pod.

In accordance with still another aspect of the invention, there is provided an accessory harness for carrying and using binoculars, cameras, small telescopes and the like. Bi-pod legs are attached to the quick attachment and release device base and are carried by suspender straps over the user's chest, and two tethers connecting a connector to portions of the suspender straps over the user's shoulders. The combination of the bi-pod legs and the tethers comfortably holds accessories for use.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 shows a pivoting bi-pod base for the quick attachment and release device according to the present invention.

FIG. 4A shows a front and side perspective view of the bi-pod base for the quick attachment and release device according to the present invention, with bi-pod legs and a third leg attached.

FIG. 4B shows a rear view of the bi-pod attachment for the quick attachment and release device according to the present invention, with the adjustable bi-pod legs attached.

FIG. 5 shows a fixed base for the quick attachment and release device according to the present invention.

FIG. 5A shows a bottom view of the fixed base for the quick attachment and release device according to the present invention.

FIG. 5B shows the fixed base for the quick attachment and release device attached to a tri-pod according to the present invention.

FIG. 8 shows a clamp-on adapter for attaching the pair of range finding binoculars for the quick attachment and release device according to the present invention.

FIG. 9 shows the clamp-on adapter attaching the base and bi-pod legs and the walking stick/third leg to the pair of binoculars using the quick attachment and release device according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
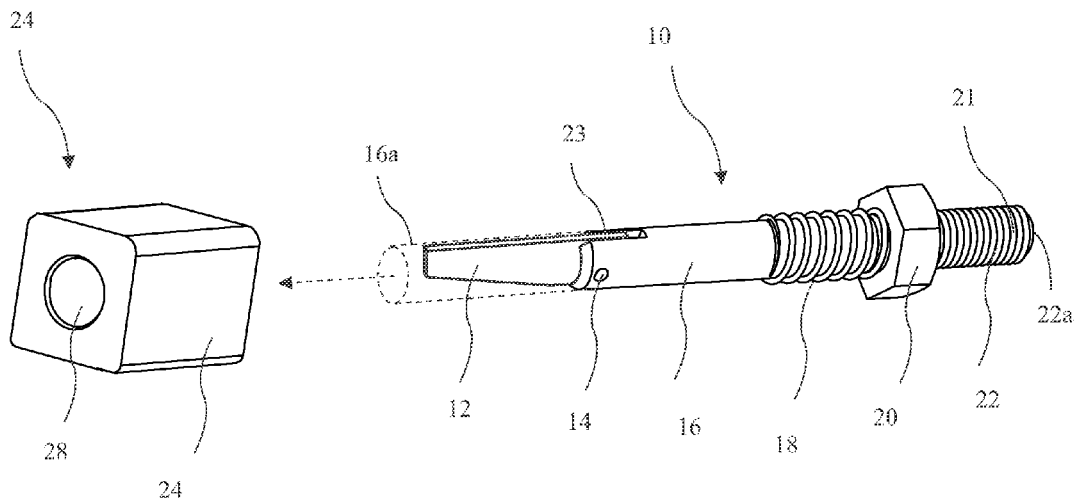
FIG. 1 shows a quick attachment and release device according to the present invention.

A quick attachment and release device 10 according to the present invention is shown in FIG. 1. The quick attachment and release device 10 includes a shaft 16 having a stop end and a slotted end 23 opposite to the stop end, the stop end preferably a threaded end 22 including threads 21 reaching to an extremity 22a of the threaded end 22 allowing the threaded end 22 to threadably engage an accessory. A spring 18 resides on the shaft 16 and a stop attached to the shaft, the stop preferably comprising a nut 20 threaded onto the threaded end 22 restricts the position of the spring 16. A toggle 12 is pivotably attached to the slotted end and pivots on a pin 14. The quick attachment and release device 10 is insertable through a generally horizontal passage 28 in a mounting block 24. The shaft and passage may be round allowing the quick attachment and release device 10 to rotate in the mounting block 24, or the shaft and passage may have a non-round cross-section to hold the quick attachment and release device 10 rotationally fixed in the mounting block 24. The toggle 12 is a one piece toggle and is shown in a first position parallel with the shaft 16, and residing within a projected shaft profile 16a.

Figure 2:
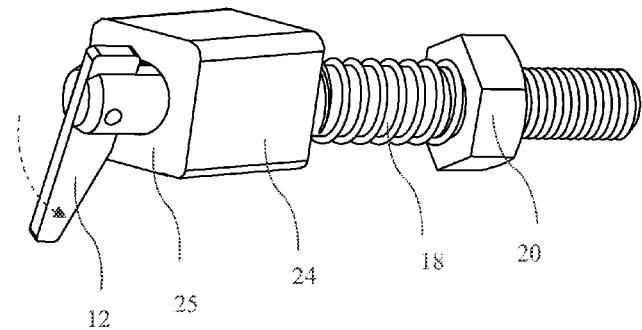
FIG. 2 shows an attached quick attachment and release device according to the present invention.

The quick attachment and release device 10 is shown attached to the block 24 in FIG. 2. The shaft 16 is inserted through the passage 28 and the spring 18 is preferably partially compressed between the block 24 and nut 20. The toggle 12 is pivoted approximately 90 degrees and rests against a face 25 of the block 24 on opposite sides of the passage 28. As a result, the spring 18 biases the block 24 against the toggle 12, holding the toggle 12 in place. The nut 20 may be adjusted to adjust resistance against pivoting the toggle 12 to release the quick attachment and release device 10 from the block 24.

A pivoting bi-pod base 30 for use with the quick attachment and release device 10 is shown in FIG. 3, a perspective view of an assembly 40 including the bi-pod base 30 with bi-pod legs 42a and 42b and third leg 44 is shown in FIG. 4A, and a rear view of the assembly 40 including the bi-pod base 30 with bi-pod legs 42a and 42b is shown in FIG. 4B. A block 24a with flanges 31 is attached to an offset arm 32, and a connector 34 is similarly attached to an opposite end of the offset arm 32. The connector 34 includes slots 36 for attaching base ends 43a of the bi-pod legs 42a and 42b and a ball-mount 38 for a third leg 44. The block 24a includes a pivot 37 and adjusting screws 35 allowing a tilt adjustment and holding for individual users. The bi-pod legs 42a and 42b include snaps 46a at supported ends 43b of the bi-pod legs 42a and 42b. The snaps 46a preferably face about 90 degrees from the centerlines of the bi-pod legs 42a and 42b. The snaps 46a can be snapped onto cooperating snaps 46b on suspender straps 84 (see FIG. 13) or clothing worn by a user. The cooperating snaps 46b may reside in small pockets 88 to firmly secure the bi-pod legs 42a and 42b, and in the event the snaps separate, the pockets 88 can still retain the bi-pod legs 42a and 42b to prevent dropping the binoculars 50 or other accessories. The snaps 46 provide additional stability while using the binoculars 50 and also can prevent damage to expensive binoculars or other accessories if they are dropped.

The pivoting bi-pod base 30 may be used with or without the third leg 44. The third leg 44 is preferably telescoping and capable of reaching to the ground to further stabilize the pivoting bi-pod base 30. The third leg 44 may further be detached from the pivoting bi-pod base 30 and used as a walking stick.

A fixed base 30' for the quick attachment and release device 10 is shown in FIG. 5, a bottom view of the fixed base 30' is shown in FIG. 5A, and the fixed base 30' attached to a tri-pod 45 is shown in FIG. 5B. The fixed base 30' includes the block 24a and offset arm 32 of the bi-pod base 30, but includes a second connector 34a attachable to a tri-pod shoe 47. Thus any accessory attachable to the base 30 is also attachable to the base 30' using the quick attachment and release device 10. The connector 34a fits a standard tri-pod head having a threaded stud reaching upward from a flat surface. The connector 34a includes a matching female thread 39 into a flat surface and preferably a rubber pad 41 on the bottom of the flat surface.

Figure 6:
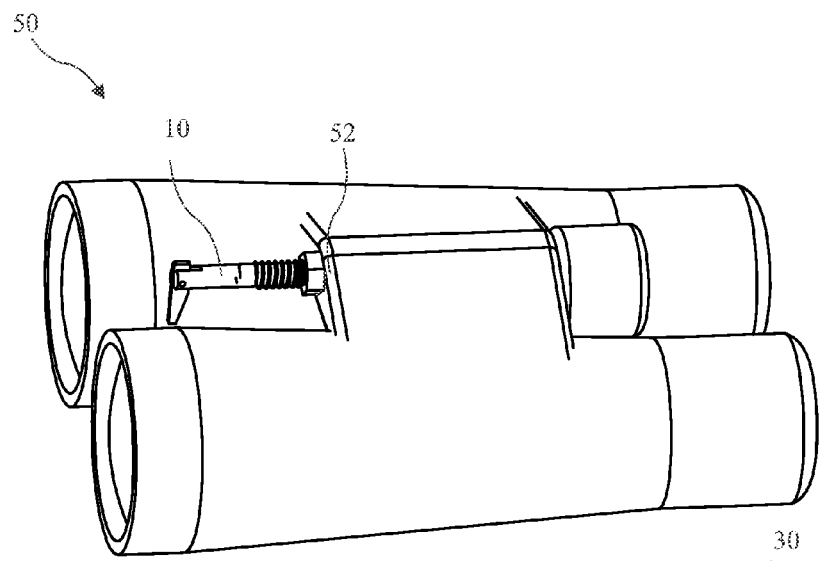
FIG. 6 shows a pair of binoculars adapted for the quick attachment and release device according to the present invention.
Figure 7:
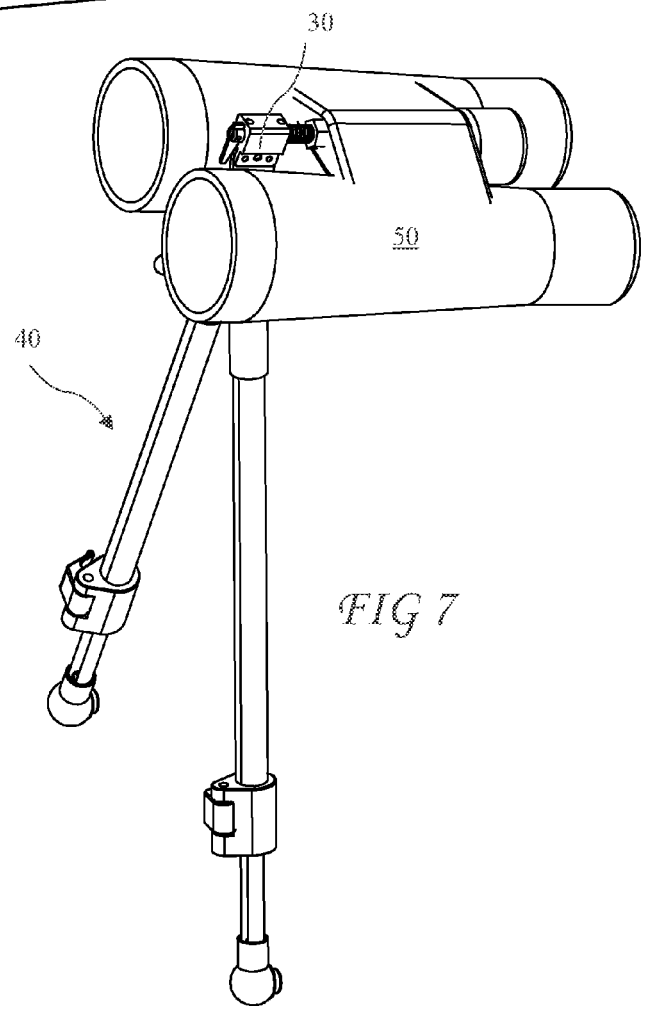
FIG. 7 shows a pair of binoculars adapted for the quick attachment and release device according to the present invention with the base and bi-pod legs attached.

A pair of binoculars 50 with the quick attachment and release device 10 attached to a laser range finder attachment point 52 is shown in FIG. 6 and the bi-pod base 30 with bi-pod legs 42a and 42b attached to the pair of binoculars 50 is shown in FIG. 7. The bi-pod legs 42a and 42b may rest on a surface to provide stability, or may be attached to the suspender straps 84 (see FIG. 13) or the like and may include a tether to hold the binoculars 50 in position for use. Supporting the binoculars 50 with the bi-pod legs 42a and 42b harness, and the tether, allows no-hands use for impaired users.

A clamp-on adapter 60 for attaching the pair of range finding binoculars 50' using the quick attachment and release device 10 is shown in FIG. 8 and the clamp-on adapter attaching bi-pod legs 42a and 42b and the tri-pod leg 44 to the range finding binocular 50' using the quick attachment and release device 10 and clamp-on adapter 60 is shown in FIG. 9. The clamp-on adapter 60 includes a ring 62 clampable over one barrel of the binoculars 50 and avoids the mounting point 52 to accommodate the range finding binocular 50'.

Figure 11:
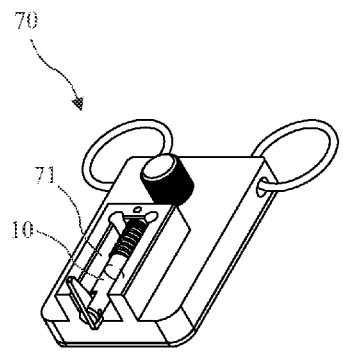
FIG. 11 shows a bottom perspective view of the threaded camera mount adapter for the quick attachment and release device according to the present invention.
Figure 10C:
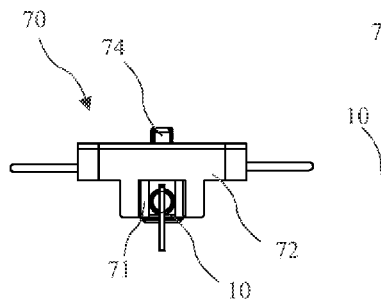
FIG. 10C shows a front view of the threaded camera mount adapter for the quick attachment and release device according to the present invention.
Figure 10A:
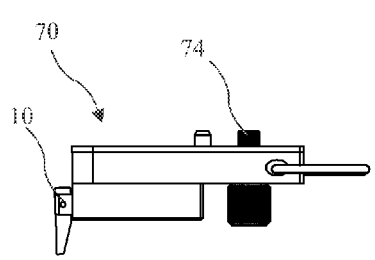
FIG. 10A shows a side view of a threaded camera mount adapter for the quick attachment and release device according to the present invention.
Figure 10D:
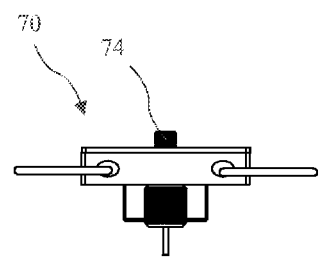
FIG. 10D shows a rear view of the threaded camera mount adapter for the quick attachment and release device according to the present invention.
Figure 10B:
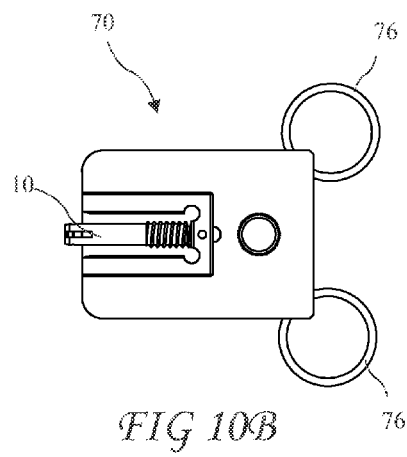
FIG. 10B shows a bottom view of the threaded camera mount adapter for the quick attachment and release device according to the present invention.

A side view of a threaded camera mount adapter 70 adapted for the quick attachment and release device 10 is shown in FIG. 10A, a bottom view of the threaded camera mount adapter 70 adapted is shown in FIG. 10B, a front view of the threaded camera mount adapter 70 adapted is shown in FIG. 10C, a rear view of the threaded camera mount adapter 70 adapted is shown in FIG. 10D, and a bottom perspective view of the threaded camera mount adapter 70 adapted is shown in FIG. 11. The threaded camera mount adapter 70 includes a mounting stud 74 for attaching a camera or the like, the stud having a knurled knob for threading into the camera. Tether loops 76 are attached to the base 70 allowing easy attachment of the tether 82. The threaded camera mount adapter 70 includes the quick attachment and release device 10 allowing attachment to, for example, the bi-pod base 30.

Figure 12:
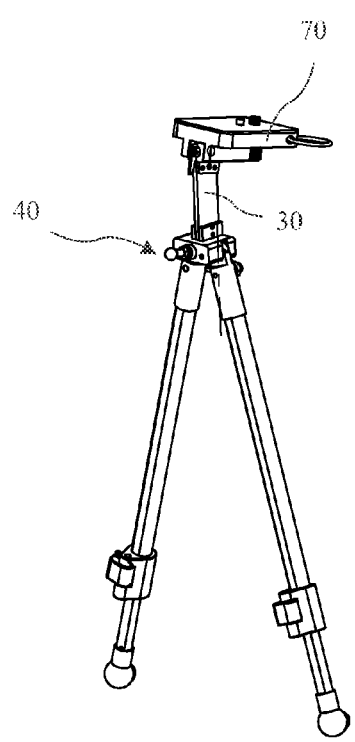
FIG. 12 shows the bi-pod legs attached to the threaded camera mount adapter for the quick attachment and release device according to the present invention.

The bi-pod base 30 with bi-pod legs 42a and 42b are shown attached to the threaded camera mount adapter 70 in FIG. 12.

Figure 13:
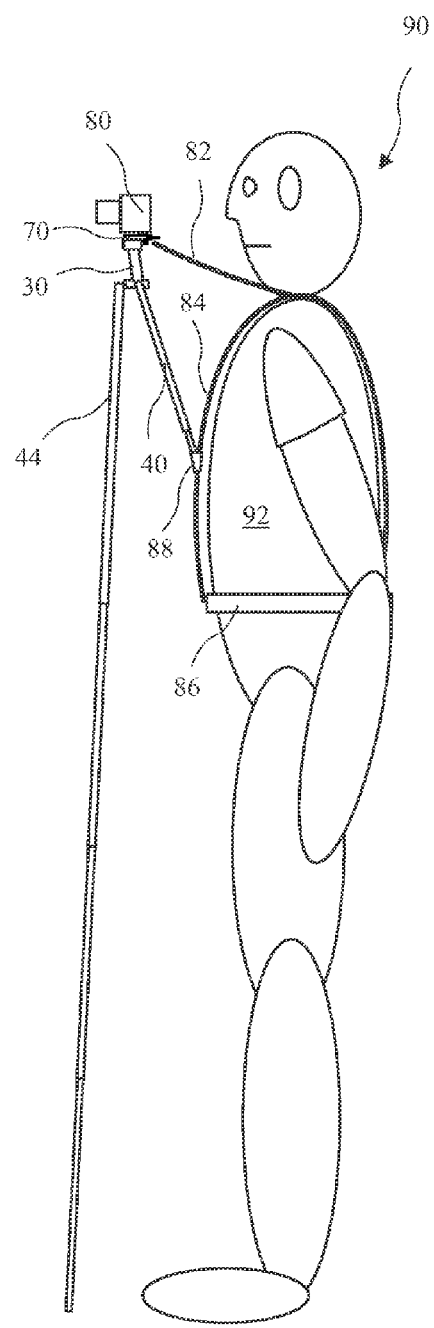
FIG. 13 shows an accessory harness according to the present invention, worn by a user.

An accessory harness according to the present invention, worn by a user 90, is shown in FIG. 13. The accessory harness includes the pivoting bi-pod base 30, bi-pod 40, base 70, tether 82, suspender straps 84, and optionally, the third leg 44. The bi-pod legs are seated in the pockets 88 of the suspender straps 84, and may be held by the snaps 46a and 46b (see FIG. 4A). The accessory harness may alternatively include clothing 92 providing the elements of the suspender straps 84.

While the invention herein disclosed has been described by means of specific embodiments and applications thereof, numerous modifications and variations could be made thereto by those skilled in the art without departing from the scope of the invention set forth in the claims.

We claim:
1. A quick attachment and release device comprising:
a shaft having a threaded end having male threads extending to an extremity of the threaded end, the threaded end threaded engagable into an accessory, and a slotted end opposite to the threaded end, the slotted end having a longitudinal slot;
a nut threaded onto the threaded end;

a spring residing on the shaft between the nut and the slotted end;

a one piece toggle pivotally attached to the shaft in the longitudinal slot, the toggle having a first position parallel to the shaft and residing within a projected profile of the shaft, and a second position perpendicular to the shaft;

a base (30) configured to attach to a support, the base comprising:

a mounting block (24) having a generally horizontal passage configured for the shaft to pass therethrough when the toggle resides in the first position and to retain the shaft in the passage when the toggle resides in the second position; and a connector (34) configured to mate to the support; and the quick attachment and release device having a locked position wherein:

the shaft resides through the passage through the mounting block;

the spring resides entirely between the mounting block and the nut, the spring separated from the toggle by the mounting block, and the spring compressed against the mounting block holding the position of the shaft with respect to the mounting block;

the toggle is residing in the second position preventing removing the shaft from the passage; and the mounting block is linearly slidable on the shaft compressing the spring and separating the mounting block from the toggle, permitting the toggle to be rotated from the second position to the first position wherein the shaft may be removed from the mounting block.

2. The device of claim 1, wherein:

the mounting block has a generally polygonal cross-section;

the shaft resides in a cooperating channel in a mount adapter and the mounting block fits inside the channel to prevent rotation of the accessory attached to the camera mount adapter.

3. The device of claim 2, wherein the mounting block has a generally rectangular cross-section and the cooperating channel in the mount adapter has a generally rectangular cross-section, the mounting block sliding into the channel and the fit between the channel and the mounting block preventing rotation of the mounting block with respect to the channel.

4. The device of claim 1, wherein the connector is attached to the mounting block by a vertical arm and the connector includes slots on opposite sides, the support comprising two bi-pod legs having ends held in the slots.

5. The device of claim 4, wherein the bi-pod legs are supported by suspender straps worn by the user.

6. The device of claim 4, wherein tethers are attached between the connector and the user providing hands-free use of the accessory.

7. The device of claim 6, wherein tethers are held proximal to the user's shoulders.

8. The device of claim 6, wherein the bi-pod legs are supported by suspender straps worn by the user at locations proximal to the user's chest and the tethers are held by the suspender straps proximal to the user's shoulders.

9. The device of claim 4, wherein a third leg is attached to the connector and is extendable to reach to the ground.

10. The device of claim 1, wherein the mounting block is attached to the connector by an offset arm.

11. The device of claim 10, wherein the mounting block is pivotally attached to the offset arm.

12. The device of claim 10, wherein the pivot of the mounting block with respect to the offset arm is adjusted and fixed by two screws.

13. The device of claim 1, wherein the connector is configured to attach to a tri-pod shoe.

14. The device of claim 13, wherein the connector includes a flat bottom surface and a female thread matching a stud in the tri-pod shoe.

15. The device of claim 14, wherein a rubber pad resides on the flat bottom surface of the connector.

16. The device of claim 1, wherein the mounting block has a generally rectangular cross section.

17. The device of claim 1, wherein the shaft is attached to a clamp-on adapter attached to a pair of range finding binoculars by a ring 62 clamped over one barrel of the range finding binoculars.

18. A quick attachment and release device comprising:

a mount adapter;

a shaft residing in and parallel to a channel in a bottom of the mount adapter, the shaft comprising:

a threaded end having male threads extending to an extremity of the threaded end and threadedly engaging the mount adapter;

a longitudinally slotted end opposite to the threaded end;

a spring residing on the shaft between a mount adapter and the slotted end;

a toggle pivotally attached to the shaft in the longitudinal slot, the toggle having a first position parallel to the shaft and residing within a projected profile of the shaft, and a second position perpendicular to the shaft;

a base configured to attach the mount adapter to a support, the base comprising:

a mounting block having a generally rectangular cross-section and a generally horizontal passage configured for the shaft to pass therethrough when the toggle resides in the first position and to retain the shaft in the passage when the toggle resides in the second position, the mounting block cooperating with the channel to prevent rotation of the camera mount adapter; and a connector configured to mate to the support;

the channel in the mount adapter having a generally rectangular cross-section and extending parallel with the engaged shaft, the mounting block linearly sliding over the shaft and into the channel and a fit between the channel and the mounting block preventing rotation of the mounting block with respect to the channel; and the quick attachment and release device having a locked position wherein:

the shaft resides through the passage through the mounting block;

the spring resides entirely between the mounting block and the mount adapter, the spring separated from the toggle by the mounting block, and the spring compressed against the mounting block;

the toggle is residing in the second position preventing removing the shaft from the passage; and the mounting block is linearly slidable on the shaft compressing the spring and separating the mounting block from the toggle, permitting the toggle to be rotated from the second position to the first position wherein the shaft may be removed from the mounting block.

19. The device of claim 18, wherein the mount adapter is a camera mount adapter.

20. A quick attachment and release device comprising:

a shaft (16) configured to attach to an accessory, the shaft comprising:

a threaded end having male threads extending to an extremity of the threaded end configured for threaded engagement into the accessory;

a longitudinally slotted end opposite to the threaded end;

a spring (18) residing on the shaft between the accessory and the slotted end;

a toggle (12) pivotally attached to the shaft in the longitudinal slot, the toggle having a first position parallel to the shaft and residing within a projected profile of the shaft, and a second position perpendicular to the shaft;

a base (30) configured to attach the accessory to a bi-pod or a tri-pod, the base comprising:

a mounting block (24) having a generally horizontal passage configured for the shaft to pass therethrough when the toggle resides in the first position and to retain the shaft in the passage when the toggle resides in the second position; and a connector (34) connected to the mounting block by an offset arm 32, the connector configured to mate to the bi-pod or to the tri-pod; and the quick attachment and release device having a locked position wherein:

the shaft resides through the passage through the mounting block;

the spring resides entirely between the mounting block and the accessory, the spring separated from the toggle by the mounting block, and the spring compressed against the mounting block;

the toggle is residing in the second position preventing removing the shaft from the passage; and the mounting block is linearly slidable on the shaft compressing the spring and separating the mounting block from the toggle, permitting the toggle to be rotated from the second position to the first position wherein the shaft may be removed from the mounting block.

\* \* \* \* \*